Nov. 7, 1967
R. J. BERTLING
3,351,789
DOUBLE OSCILLATOR ELECTRIC MOTOR
Filed Oct. 12, 1964
2 Sheets-Sheet 1
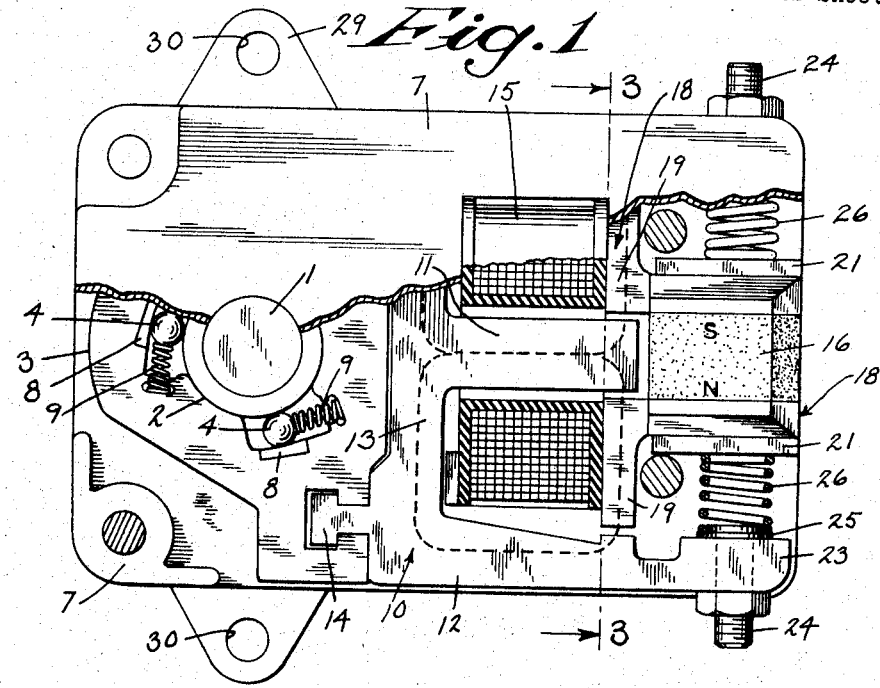
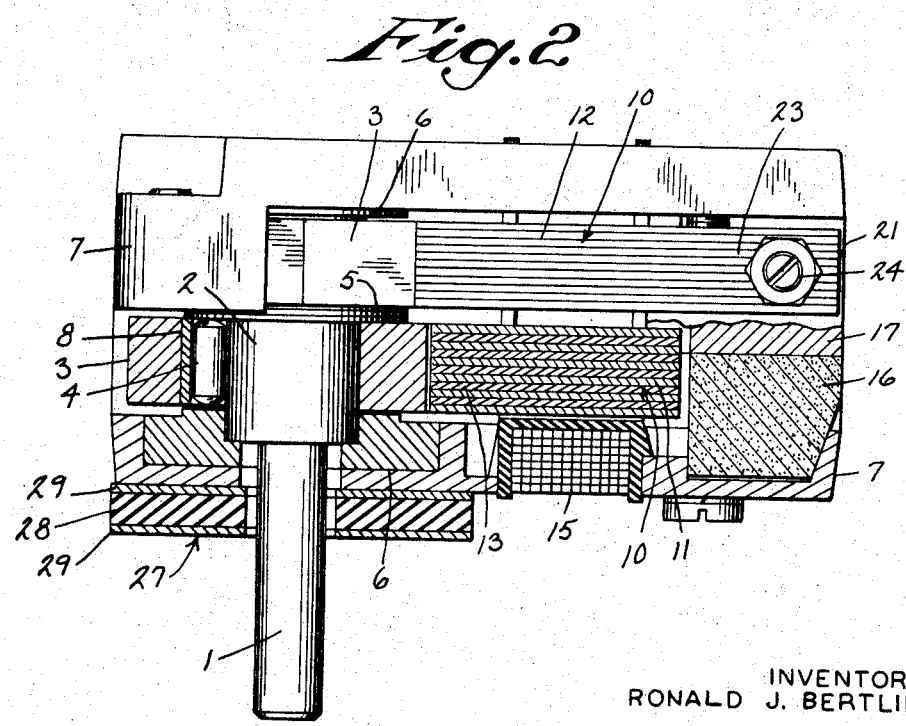
INVENTOR
RONALD J. BERTLING
BY *Arthur H. Seidel*
ATTORNEY Nov. 7, 1967   R. J. BERTLING   3,351,789
DOUBLE OSCILLATOR ELECTRIC MOTOR
Filed Oct. 12, 1964                   2 Sheets-Sheet 2
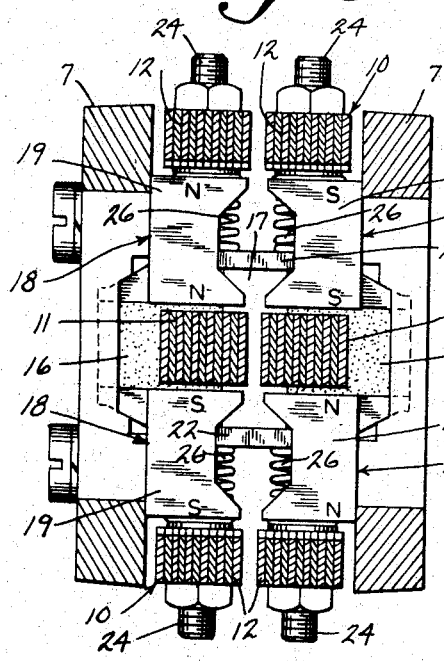
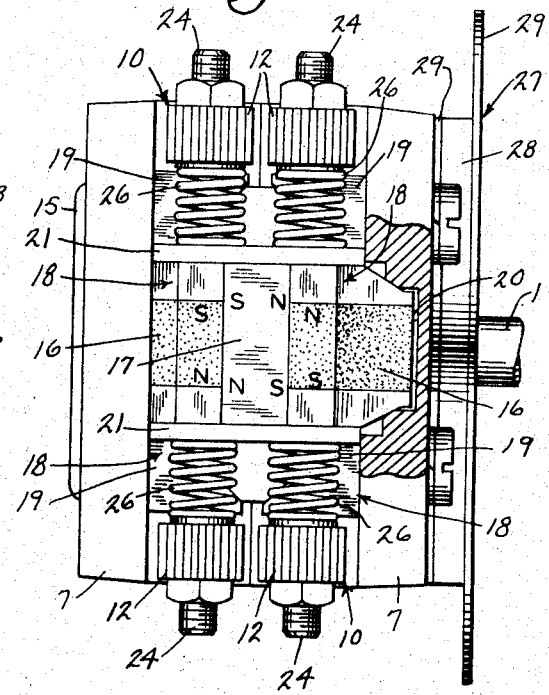
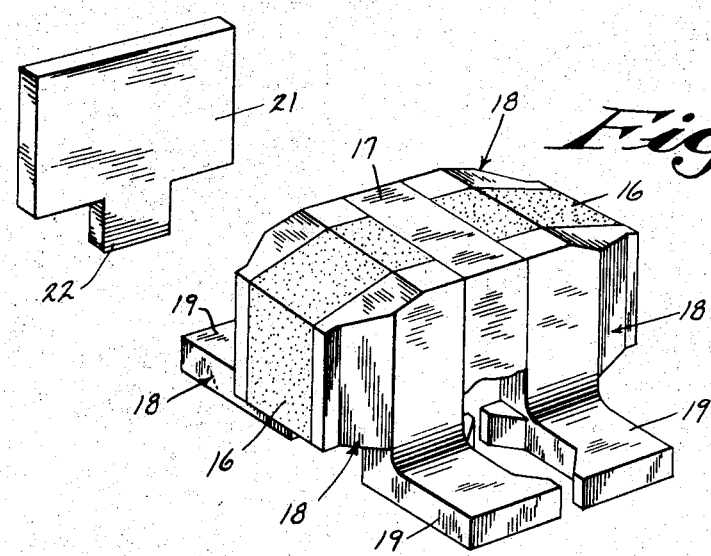
INVENTOR
RONALD J. BERTLING
BY
*Arthur H. Seidel*
ATTORNEY United States Patent Office 3,351,789
Patented Nov. 7, 1967

3,351,789
DOUBLE OSCILLATOR ELECTRIC MOTOR
Ronald J. Bertling, Grafton, Wis., assignor to Energy Conversion Systems Corporation, Grafton, Wis., a corporation of Wisconsin
Filed Oct. 12, 1964, Ser. No. 403,188
11 Claims. (Cl. 310—37)

ABSTRACT OF THE DISCLOSURE

An oscillatory electric motor in which oscillatory movement is converted to rotary motion, the motor having a pair of armatures in the form of E-shaped magnets each connected to an output shaft through a clutch, a coil encircling the center leg of both armatures to develop alternating flux therein, a pair of U-shaped stationary magnetic members with the legs thereof interdigited with the legs of the E-shaped magnets, and said U-shaped members having a second source of magnetic flux associated therewith.

*Summary of invention and background*

This invention relates to oscillatory electric motors and it more specifically resides in a motor having a pair of oscillatory magnetic members coupled to an output shaft, a source of magnetix flux for such members, a second pair of magnetic members each associated with one of said oscillatory magnetic members and a second source of magnetic flux for the second pair of magnetic members whereby magnetic forces that are established cause the oscillatory magnetic members to move back and forth to drive the output shaft.

In co-pending application Ser. No. 195,467 of James S. Neal filed May 17, 1962, for "Oscillatory Motor," now Patent No. 3,202,849 there is shown and described a motor that is particularly useful for obtaining a slow speed for the motor output shaft. The motor in that application is shown in a variety of forms that are characterized by the provision of a pair of magnetic members with a source of magnetic flux for each member. The interplay of the magnetic fields causes at least one of the magnetic members to oscillate, and this oscillatory motion is translated through a clutch element to an output shaft, whereby the shaft is driven in increments of rotation to obtain a slow speed motor. Substantial torque and power is obtained from the motor at slow speeds which characterizes it as an important advance in the motor arts.

The present invention generally relates to improvements in such oscillatory motor, and is particularly characterized by the provision of a pair of oscillatory magnetic members. These members oscillate in opposite directions, such that a clockwise rotation of one member will be accompanied by a counterclockwise rotation of the other member, and upon a reversal in the direction of oscillation of the first member the second member will likewise reverse direction. In this fashion, the two oscillatory magnetic members alternate in driving a common output shaft, such that while one is driving the shaft through an appropriate coupling, such as a clutch, the other oscillatory member is retreating preparatory to its driving stroke.

For each oscillatory magnetic member there is provided a second magnetic member with a second source of flux. Usually these magnetic members will be stationary, and in the particular form illustrated herein they are grouped together into a composite assembly. This assembly includes a pair of closely spaced permanent magnets, each of such magnets servicing one of said oscillatory magnetic members. To reduce leakage of magnetic flux between such working magnets, a third buffer magnet is interposed therebetween with magnetic poles oriented to inhibit a crossover of flux from one working magnet to the other. In this fashion a compact structure is obtained.

One of the objects of the present invention is to obtain a motor with a very quiet operating characteristic. In an oscillatory electric motor it is necessary to rapidly accelerate and decelerate the oscillatory parts, and vibrations may be objectionable in some installations. When a motor is mounted tightly against the wall of a housing, the housing might amplify vibratory noise and the resulting sound may be objectionable. In the present motor two oscillatory members work in opposite directions, and vibratory forces largely cancel, resulting in quiet operation.

Another object of the present invention is to obtain a motor with nearly constant torque output. In a single oscillatory member motor the torque is delivered in discrete pulses interrupted by intervals of like duration. By the provision of multiple oscillatory members the pulses of torque successively follow one another in smoother fashion, and the resulting even distribution of torque output with respect to time is desirable in various applications.

It is another object of this invention to have a pair of oscillatory members each coupled through a clutch to an output shaft wherein the clutches are of the overrunning type. The clutches then alternately grasp the shaft and deliver torque through an entire electric cycle, and no brake is required to hold the shaft from reverse rotation during a retreating oscillation of an oscillatory member.

It is another object of this invention to provide a double oscillatory electric motor in which a single coil can be utilized for supplying alternate current flux to a pair of magnetic members.

It is another object of this invention to obtain a shaft speed in excess of that obtainable from similar structures having but a single oscillatory magnetic member.

The foregoing and other objects and advantages will appear from the description to follow. In the description reference is made to the accompanying drawings which form a part hereof, and in which there is shown by way of illustration a specific embodiment in which this invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

In the drawings:

FIG. 1 is a top or plan view of a motor embodying the invention with parts of the cover and coil broken away to reveal the interior construction, FIG. 2 is a side view of the motor of FIG. 1 with the lower half of the cover and internal parts within the lower half all in section, FIG. 3 is a view in section of the motor taken on the plane 3—3 shown in FIG. 1, FIG. 4 is an end view of the motor taken from the right hand end as shown in FIG. 1, and with a portion of the cover broken away to show the mounting of stationary magnetic parts, FIG. 5 is a view in perspective of a composite magnetic assembly forming a part of the invention, and FIG. 6 is a view in perspective of a spring seating plate forming a part of the motor.

Referring now to the drawings, and more particularly FIGS. 1 and 2, there is shown an output shaft 1 with a hub 2 of larger diameter that is located within the interior of the motor. The hub 2 is encircled by a pair of clutch housings 3, one of which is partially seen in plan view in FIG. 1 to reveal the interior of a clutch assembly, and a pair of which are seen in FIG. 2 with the lower being in section to reveal a clutch roller 4 and its relationship to the hub 2. The clutch housings 3 are separated from one another by a set of washers 5 which enclose one side of the interior of each housing 3. The opposite side of each clutch housing 3 is enclosed by a bearing 6 that receives and positions the shaft hub 2, and the bearings 6 in turn are mounted in a pair of like covers 7. The covers 7 are bolted to one another and the lower cover 7, as seen in FIG. 2, is shown in section.

As particularly shown in FIG. 1, each clutch housing 3 has a number of recesses about the hub 2 which house a set of the rollers 4, which rollers 4 bear against the hub 2 and also against hard metal inserts 8 seated in the housings 3. The surface of the inserts 8 form short lengths of a spiral with respect to the hub 2, so that upon a counterclockwise rotation, as viewed in FIG. 1, of a clutch housing 3 the associated rollers 4 are each wedged between the hub 2 and an insert 8 to rotate the shaft 1 in the same direction. Upon a clockwise rotation, as viewed in FIG. 1, the rollers 4 will be free to slip, and hence the coupling illustrated is in the form of an overrunning clutch. Bias springs 9 are also provided to have the rollers 4 remain in engagement between the hub 2 and inserts 8 at all times.

Each clutch housing 3 mounts an E-shaped, laminated, oscillatory magnetic member 10 having a central leg 11 and a pair of side legs 12. The E-shaped configuration is shown in FIG. 1, and the legs 11, 12 of a member 10 are joined with one another by a yoke 13 extending alongside the associated clutch housing 3. The yoke 13 also includes appropriate tenons 14 which dovetail in the housing 3 to have a secure connection, whereby each housing 3 and member 10 form an oscillatory unit. The oscillatory magnetic members 10 are disposed one above the other, as particularly shown in FIG. 2, with the windings of a common energizing coil 15 encircling both of the central legs 11. The coil 15 is adapted for connection with a source of alternating current, so that it will establish an alternating magnetic flux in each of the oscillatory magnetic members 10.

A composite stationary magnetic assembly, as shown in perspective in FIG. 5, is mounted by the two covers 7 in a position for magnetic cooperation with the E-shaped oscillatory magnetic members 10. This composite assembly actually comprises a pair of U-shaped stationary magnetic members, one associated with each E-shaped oscillatory member 10. These U-shaped members each have a permanent working magnet 16, preferably formed from a hard ferrite having substantial reluctance. The two permanent working magnets 16 are of like configuration and magnetic intensity, but they are assembled into the composite assembly with polarities as labeled in FIG. 4. The north magnetic pole of one magnet 16 faces in one direction, while the north magnetic pole of the other permanent magnet 16 faces in the opposite direction. The magnets 16 are closely spaced, to have a compact motor, and magnetic flux might leak from one magnet to the other. To avoid such leakage, there is interposed between the permanent magnets 16 an isolating magnet 17, also of a hard ferrite material, and this magnet 17 has magnetic polarities as indicated in FIG. 4. As will be observed from the indicated polarities in FIG. 4, the isolating magnet 17 inhibits the leakage of magnetic flux from one permanent magnet 16 to the other permanent magnet 16, so that the two magnets 16 may be said to be magnetically isolated.

Along each pole face of each working permanent magnet 16 is a magnetic pole piece 18 of somewhat complex configuration. Each pole piece 18 has a pole shoe 19 that is interposed between a central leg 11 and a side leg 12 of an oscillatory magnetic member 10, as particularly shown in FIGS. 1 and 3. Hence, each pole shoe 19 presents a magnetic polarity to the ends of the legs 11, 12 between which it is disposed which corresponds to the polarity of the permanent magnet pole face which it abuts. The pole shoes 19 also provide a path for the alternating flux established by the coil 15 which extends between the ends of the associated legs 11, 12. The multiple parts of the composite stationary magnetic assembly of FIG. 5 are of such configuration that they are securely held within suitable cavities 20 in the covers 7, as shown in FIG. 4, and along each of these assemblies is placed a non-magnetic snubber spring plate 21. One of these plates 21 is shown in perspective in FIG. 6, and it is seen to have a generally T-shaped configuration with a small trunk 22 of the T adapted for insertion between a pair of pole shoes 19, so as to be held in place.

The outer end of each laminated side leg 12, that is the end remote from the yoke 13, is extended to form a snubber spring seat 23 that receives an adjustment screw 24 having a head 25 which seats one end of a snubber spring 26. The opposite end of each snubber spring 26 seats against one of the snubber spring plates 21, and it's the function of the snubber springs 26 to arrest oscillatory motion of the magnetic members 10, so as to confine the length of stroke of the members 10.

To complete the motor a mounting plate 27 is secured to the side of one of the covers 7. The plate 27 has a resilient vibration dampening layer 28 sandwiched between two sheet metal skins 29, one of which skins 29 includes mounting holes 30.

In operating the motor, the coil 15 is connected to a source of alternating current to thereby establish an alternating flux in both the oscillatory magnetic members 10. The general path of this alternating flux is shown in dotted lines in FIG. 1, and it is seen that for each member 10 the alternating flux branches from the outer end of the central leg 11 into the associated pole shoes 19, then to the side legs 12 and back through the yoke 13 to the central leg 11. The polarity of this flux will be alternating, so that for one-half cycle the outer end of each central leg 11 will have one polarity and for the next half cycle the outer end of each central leg 11 will have the opposite polarity. The polarities of the side legs 12 will, of course, be of polarities opposite their associated central legs 11, and both oscillatory magnetic members 10 will have like flux polarities at any given time by reason of having a common coil 15. Another aspect of the construction of each member 10 is that it presents a set of four poles in which each side leg 12 has a pole where flux enters its outer end and the central leg 11 has a pair of poles where flux leaves its outer end and passes over to a side leg.

Turning now to a consideration of the permanent magnet flux, as shown in FIG. 1, each working permanent magnet 16 and its two associated magnetic pole pieces 18 comprise a single stationary magnetic member associated with a single oscillatory magnetic member 10, in which the pole pieces 18 extend from an intimate physical contact with the magnet 16 to positions occupied by the pole shoes 19 that are between the poles presented by the associated center leg 11 and side legs 12. Hence, each magnet 16 and its pole pieces 18 present a U-shape in which the legs of the U are interdigited with the legs of the E-shaped magnetic member 10. The pole shoes 19 of each working permanent magnet 16 will have polarities as designated in FIG. 3, and each stationary magnetic member comprising a magnet 16 and a pair of pole pieces 18, presents a set of four poles. As clearly shown in FIG. 1, each pole is at an end of a pole shoe 19 in closely spaced relation to a pole of the associated oscillatory magnetic member 10, whereby air gaps are established between poles through which the legs 11, 12 of the members 10 oscillate.

As a result of the permanent magnet polarities shown, the oscillatory magnetic members 10 will oscillate in opposite directions. When the alternating current flux is of such polarity as to cause one magnetic member 10 to move clockwise, as viewed in FIG. 1, the other member will be moving counterclockwise. That member 10 which is moving counterclockwise will be delivering torque to the output shaft 1 through its associated clutch coupling, and the other member 10 will be retreating to position itself for a subsequent power stroke. In each half cycle of the alternating current supplied to coil 15 one of the magnetic members 10 will provide a power stroke, and hence there are two power strokes for each cycle of the frequency applied to the coil 15.

The action of the snubber springs 26 is similar to that described in said co-pending application, and primarily they arrest the oscillating legs 11, 12 from colliding with the pole shoes 19 of the stationary magnetic members. Thus, the poles of the legs 11, 12 and of the pole shoes 19 directly face one another and the legs 11, 12 travel directly toward the pole shoes 19 in collision courses. Maximum attractive forces are derived from this arrangement, but the poles of the legs 11, 12 are inhibited from colliding with the pole shoes 19, so that detrimental wear does not unduly occur.

A motor as described has a high degree of balance in its internal vibratory mechanical forces, so that there is a substantial cancellation which produces quiet operation. The oscillatory type motor can consequently be applied to a wide range of usage, and the particular motor described herein has relatively large torque and power output, so that loads of magnitude may be handled. Variations may be made in the design of the motor, for example the stationary magnet assembly shown in FIG. 5 might be separated into two physically distinct stationary magnetic members. There may also be a reversal in position of the alternating flux and fixed flux members to have the permanent magnet members be the oscillatory members. Also, all members could be positioned by snubber springs to the common covers, to suggest apparent alterations. Also, different types of couplings might be used in place of the clutches disclosed, for example ratchet mechanisms and the like might be utilized as couplings. These and other variations may occur to those skilled in the art, without departing from the invention and reference is now made to the appended claims.

I claim:

1. In an oscillatory electric motor the combination comprising:
 a pair of oscillatory magnetic members each presenting a set of magnetic poles;
 an output shaft;
 a pair of couplings one between each oscillatory magnetic member and said output shaft;
 a source of magnetic flux for said oscillatory magnetic members;
 a second pair of magnetic members, each associated with one of said oscillatory magnetic members and presenting a set of magnetic poles in spaced relation to the magnetic poles of the associated oscillatory member; and
 a second source of magnetic flux for said second pair of magnetic members.

2. A motor as in claim 1 wherein one source of flux comprises windings adapted for establishing an alternating flux, and the other source of flux comprises permanent magnet means.

3. In an oscillatory electric motor the combination comprising:
 a pair of oscillatory magnetic members each presenting a set of four poles;
 an output shaft;
 a pair of torque transmitting overrunning clutches one between each oscillatory magnetic member and said output shaft;
 a source of magnetic flux for said oscillatory magnetic members;
 a second pair of magnetic members, each associated with one of said oscillatory magnetic members and each presenting a set of four poles in spaced relation to the four poles of its associated oscillatory magnetic member; and
 a second source of magnetic flux for said second pair of magnetic members.

4. A motor as in claim 3 wherein one source of flux comprises windings adapted for establishing an alternating flux, and the other source of flux comprises a pair of permanent magnet means.

5. A motor as in claim 3 wherein said pair of oscillatory magnetic members oscillate with directions of motion opposite one another.

6. In an oscillatory electric motor the combination comprising:
 an output shaft;
 a pair of torque transmitting couplings associated with said shaft;
 a pair of magnetic members each connected with one of said couplings and having a central leg and a pair of side legs;
 windings encircling both of said central legs; and
 a composite magnetic assembly having a pair of permanent magnets one for each of said pair of magnetic members wherein each permanent magnet has a pair of pole pieces, one for each polarity, with each pole piece being magnetically interposed between a central leg and a side leg of one of said pair of magnetic members.

7. In an oscillatory electric motor the combination comprising:
 an output shaft;
 a pair of clutches associated with said shaft, each adapted to be advanced in one direction in which said shaft is moved with the clutch and to be retracted in reverse direction in which there is slippage between clutch and shaft;
 a pair of oscillatory magnetic members each connected with one of said clutches and each having a central magnetic leg, a pair of side magnetic legs, and a magnetic yoke joining the legs with one another;
 windings encircling both of said central legs; and
 a stationary composite magnetic assembly having a pair of permanent magnets, one for each of said pair of oscillatory magnetic members wherein each permanent magnet has an associated pair of pole pieces, one for each polarity, that are each magnetically interposed between a central leg and a side leg of the associated oscillatory magnetic member.

8. In an oscillatory electric motor the combination comprising:
 an output shaft;
 a pair of clutches on said shaft each gripping the shaft upon rotation in one direction to rotate the shaft therewith and releasing from the shaft upon rotation in the opposite direction, whereby upon reciprocating movement of the clutches in opposite directions they alternately rotate said shaft in incremental movements;
 a pair of oscillatory magnetic members each attended to one of said clutches;
 windings encircling both of said oscillatory magnetic members to establish alternating flux therein; and
 a composite stationary magnetic assembly having a pair of hard ferrite magnets spaced from one another, an isolating magnet between said hard ferrite magnets with poles in magnetic opposition to poles of said hard ferrite magnets, and pole pieces for said hard ferrite magnets which have pole shoes in spaced relation to said oscillatory magnetic members.

9. A motor as in claim 8 wherein each oscillatory magnetic member has a central leg and a pair of side legs; each hard ferrite magnet and its pole pieces comprise a stationary magnetic member associated with an oscillatory magnetic member; and the pole pieces for each hard ferrite magnet form legs that are each disposed between a center leg and side leg of an oscillatory magnetic member.

10. In an oscillatory electric motor the combination comprising:
- a pair of E-shaped magnetic members;
- a pair of U-shaped magnetic members each associated with and relatively oscillatory with respect to one of said E-shaped members, with the legs of the U shape magnetically interposed between the legs of the E shape;
- sources of magnetic flux for said E and U shaped magnetic members including an oscillatory source whereby each associated E shaped member and U shaped member oscillate relatively to one another;
- an output shaft; and
- a pair of couplings each between said shaft and an associated pair of E and U shaped members that oscillates with said relatively oscillatory movement adapted to group said shaft in one direction of movement and to release from the shaft in the opposite direction of movement.

11. In an oscillatory electric motor the combination comprising:
- an output shaft;
- a pair of oscillatory magnetic armatures each pivotable in a back and forth motion about said shaft;
- a pair of clutches one between each oscillatory magnetic armature and said output shaft that rotate the shaft upon movement in one direction of the back and forth motion;
- a first source of magnetic flux for said oscillatory magnetic armatures that establishes flux within the armatures and exists therefrom to define a set of magnetic poles; and
- a set of magnetic members providing magnetic poles in spaced relation to the magnetic poles of said armatures, said set of magnetic members including a second source of magnetic flux that interacts with the flux of said first source in the regions of said poles to cause oscillation of said armatures.

References Cited
UNITED STATES PATENTS

| | | | |
|---|---|---|---|
| 2,741,712 | 4/1956 | Lonnqvist | 310—37 |
| 3,278,818 | 10/1966 | Winstock | 318—120 X |
| 3,302,045 | 1/1967 | Dotto | 310—37 |
| 3,202,849 | 8/1965 | Neal | 310—37 |

MILTON O. HIRSHFIELD, *Primary Examiner.*

D. F. DUGGAN, *Assistant Examiner.*

UNITED STATES PATENT OFFICE
CERTIFICATE OF CORRECTION

Patent No. 3,351,789                                  November 7, 1967

Ronald J. Bertling

It is hereby certified that error appears in the above numbered patent requiring correction and that the said Letters Patent should read as corrected below.

Column 1, line 28, for "magnetix" read -- magnetic --; column 4, line 10, for "confiuration" read -- configuration --; column 6, line 29, for "trol" read -- tral --; line 60, for "attended" read -- attached --.

Signed and sealed this 12th day of November 1968.

(SEAL)
Attest:

Edward M. Fletcher, Jr.
Attesting Officer

EDWARD J. BRENNER
Commissioner of Patents